(12) United States Patent
Baldemair et al.

(10) Patent No.: US 9,386,470 B2
(45) Date of Patent: Jul. 5, 2016

(54) POWER HEADROOM REPORTING FOR CARRIER AGGREGATION

(75) Inventors: Robert Baldemair, Solna (SE); Dirk Gerstenberger, Stockholm (SE); Daniel Larsson, Solna (SE); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1238 days.

(21) Appl. No.: 13/063,376

(22) PCT Filed: Feb. 28, 2011

(86) PCT No.: PCT/SE2011/050226
§ 371 (c)(1),
(2), (4) Date: Jun. 12, 2011

(87) PCT Pub. No.: WO2011/139200
PCT Pub. Date: Nov. 10, 2011

(65) Prior Publication Data
US 2012/0008552 A1    Jan. 12, 2012

Related U.S. Application Data

(60) Provisional application No. 61/331,164, filed on May 4, 2010, provisional application No. 61/349,605, filed on May 28, 2010.

(51) Int. Cl.
| | | |
|---|---|---|
| *H04W 4/00* | (2009.01) | |
| *H04W 24/10* | (2009.01) | |
| *H04W 52/14* | (2009.01) | |
| *H04W 52/30* | (2009.01) | |

(Continued)

(52) U.S. Cl.
CPC ............. *H04W 24/10* (2013.01); *H04L 5/0053* (2013.01); *H04W 52/146* (2013.01); *H04W 52/30* (2013.01); *H04W 52/343* (2013.01); *H04W 52/365* (2013.01); *H04W 52/34* (2013.01)

(58) Field of Classification Search
None
See application file for complete search history.

(56) References Cited

U.S. PATENT DOCUMENTS

| 2006/0203724 A1 | 9/2006 | Ghosh et al. |
| 2007/0097962 A1 | 5/2007 | Yoon et al. |

(Continued)

FOREIGN PATENT DOCUMENTS

| EP | 2 360 979 A1 | 8/2011 |
| RU | 2007137009 A | 4/2009 |
| RU | 2008116168 A | 12/2009 |

OTHER PUBLICATIONS

International Search Report for PCT/SE2011/050226, mailed Jun. 30, 2011.

(Continued)

*Primary Examiner* — Willie J Daniel, Jr.
(74) *Attorney, Agent, or Firm* — Patent Portfolio Builders PLLC

(57) ABSTRACT

Power headroom reporting and report handling are discussed in the context of a Physical Uplink Shared Channel (PUSCH), on which a user equipment (UE) has no valid uplink grant, and a Physical Uplink Control Channel (PUCCH) on which a UE has no transmission. Under these circumstances, it is not possible to directly calculate one or more parameters which are used to calculate power headroom. Accordingly, exemplary embodiments provide for predetermined, known values to be used by the UE to calculate the power headroom, and by the eNodeB to understand the meaning of a received power headroom report.

36 Claims, 10 Drawing Sheets

(51) Int. Cl.
*H04W 52/34* (2009.01)
*H04W 52/36* (2009.01)
*H04L 5/00* (2006.01)

(56) References Cited

U.S. PATENT DOCUMENTS

| | | | |
|---|---|---|---|
| 2007/0149235 A1 | 6/2007 | Chin et al. | |
| 2010/0099429 A1 | 4/2010 | Ishii et al. | |
| 2010/0158147 A1* | 6/2010 | Zhang et al. | 375/260 |
| 2012/0224552 A1* | 9/2012 | Feuersanger et al. | 370/329 |

OTHER PUBLICATIONS

Written Opinion of the International Searching Authority for PCT/SE2011/050226, mailed Jun. 30, 2011.

Catt: "Considerations on uplink power control in LTE-Advanced", 3GPP Draft; R1-100071, 3rd Generation Partnership Project (3GPP), Mobile Competence Centre; 650, Route Des Lucioles; F-06921 Sophia-Antipolis Cedex; France, vol. RAN WG1, no. Valencia, Spain; Jan. 18, 2010, Jan. 12, 2010, XP050417814, entire document.

Ericsson et al.: "PHR Reporting for CA", 3GPP Draft; R2-104471-PHR Reporting for CA, 3rd Generation Partnership Project (3GPP), Mobile Competence Centre; 650, Route Des Lucioles; F-06921 Sophia-Antipolis Cedex; France, vol. RAN WG2, no. Madrid, Spain; 2100823, Aug. 16, 2010, XP050451696, entire document.

Ericsson et al.: "Further discussion on PHR for carrier aggregation", 3GPP Draft; R1-105316, 3rd Generation Partnership Project (3GPP), Mobile Competence Centre; 650, Route Des Lucioles; F-06921 Sophia-Antipolis Cedex; France, vol. RAN WG1, no. Xi'an; Oct. 11, 2010, Oct. 5, 2010, XP050450479, entire document.

Research in Motion UK Limited: "Remaining issues on Uplink Power Control for Carrier Aggregation", 3GPP Draft; R1-100569 (Rim-Up Power Control for CA), 3rd Generation Partnership Project (3GPP), Mobile Competence Centre; 650, Route Des Lucioles; F-06921 Sophia-Antipolis Cedex; France, vol. RAN WG1, no. Valencia, Spain; Jan. 18, 2010, XP050418186, entire document.

TSG RAN WG1: "LS on the reference format on virtual PHR", 3GPP Draft; R1-105820, 3rd Generation Partnership Project (3GPP), Mobile Competence Centre; 650, Route Des Lucioles; F-06921 Sophia-Antipolis Cedex; France, vol. RAN WG1, no. Xi'an; Oct. 11, 2010, Oct. 16, 2010, XP050463458, entire document.

European Office Action in European Application No. 11 715 294.2-1855 dated Aug. 30, 2013.

Research in Motion, UK Limited; "PH reporting for Carrier Aggregation"; 3 GPP TSG RAN WG! Meeting # 61, R1-103066' 3rd Generation Partnership Project (3GPP) XP050420155; May 10-14, 2010; Montreal, Canada.

European Search Report mailed Jun. 23, 2014 in related European Application No. EP 14150748.3 (All references cited in search report were previously provided with IDS filed Dec. 22, 2011).

Russian Decision on Grant, dated Jul. 8, 2015, in related Russian Application No. 2012151845/07(082697).

* cited by examiner

POWER HEADROOM REPORTING FOR CARRIER AGGREGATION

TECHNICAL FIELD

The present invention relates generally to telecommunications systems, and in particular, to methods, systems, devices and software for power headroom reporting in radiocommunications systems.

BACKGROUND

Radiocommunication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radiocommunication applications, while at the same time using legacy infrastructure, network operators could deploy hybrid networks wherein a next generation radiocommunication system is overlaid onto an existing circuit-switched or packet-switched network as a first step in the transition to an all IP-based network. Alternatively, a radiocommunication system can evolve from one generation to the next while still providing backward compatibility for legacy equipment.

One example of such an evolved network is based upon the Universal Mobile Telephone System (UMTS) which is an existing third generation (3G) radiocommunication system that is evolving into High Speed Packet Access (HSPA) technology. Yet another alternative is the introduction of a new air interface technology within the UMTS framework, e.g., the so-called Long Term Evolution (LIE) technology. Target performance goals for LTE systems include, for example, support for 200 active calls per 5 MHz cell and sub 5 ms latency for small IP packets. Each new generation, or partial generation, of mobile communication systems add complexity and abilities to mobile communication systems and this can be expected to continue with either enhancements to proposed systems or completely new systems in the future.

LTE uses orthogonal frequency division multiplexing (OFDM) in the downlink and discrete Fourier transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval. In the time domain, LTE downlink transmissions are organized into radio frames of 10 ms, each radio frame consisting of ten equally-sized subframes of length $T_{subframe}=1$ ms as shown in FIG. 2.

Furthermore, the resource allocation in LTE is typically described in terms of resource blocks, where a resource block corresponds to one slot (0.5 ms) in the time domain and 12 subcarriers in the frequency domain. Resource blocks are numbered in the frequency domain, starting with 0 from one end of the system bandwidth. Downlink transmissions are dynamically scheduled, i.e., in each subframe the base station (typically referred to as an eNB in LTE) transmits control information indicating to which terminals and on which resource blocks the data is transmitted during the current downlink subframe. This control signaling is typically transmitted in the first 1, 2, 3 or 4 OFDM symbols in each subframe. A downlink system with 3 OFDM symbols as the control region is illustrated in FIG. 3.

LTE uses hybrid-ARQ where, after receiving downlink data in a subframe, the terminal attempts to decode it and reports to the base station whether the decoding was successful (ACK) or not (NAK). In case of an unsuccessful decoding attempt, the base station can retransmit the erroneous data. Uplink control signaling from the terminal to the base station thus consists of: hybrid-ARQ acknowledgements for received downlink data; terminal reports related to the downlink channel conditions, used as assistance for the downlink scheduling (also known as Channel Quality Indicator (CQI)); and scheduling requests, indicating that a mobile terminal needs uplink resources for uplink data transmissions.

If the mobile terminal has not been assigned an uplink resource for data transmission, the L1/L2 control information (channel-status reports, hybrid-ARQ acknowledgments, and scheduling requests) is transmitted in uplink resources (resource blocks) specifically assigned for uplink L1/L2 control information on the Physical Uplink Control Channel (PUCCH). Different PUCCH formats are used for the different information, e.g. PUCCH Format 1a/1b are used for hybrid-ARQ feedback, PUCCH Format 2/2a/2b for reporting of channel conditions, and PUCCH Format 1 for scheduling requests. To transmit data in the uplink the mobile terminal has to be assigned an uplink resource for data transmission, on the Physical Uplink Shared Channel (PUSCH). In contrast to a data assignment in the downlink, in the uplink the assignment must always be consecutive in frequency, in order to retain the signal carrier property of the uplink as illustrated in FIG. 4. In LTE Rel-10 this restriction may however be relaxed enabling non-contiguous uplink transmissions.

The middle single carrier-symbol in each slot is used to transmit a reference symbol. If the mobile terminal has been assigned an uplink resource for data transmission and at the same time instance has control information to transmit, it will transmit the control information together with the data on PUSCH. In Rel-10 also simultaneous transmission of PUSCH and PUCCH in the same subframe is supported.

Uplink power control, i.e., controlling the power at which the mobile terminal is transmitting to the base station, is used both on the PUSCH and on the PUCCH. The purpose is to ensure that the mobile terminal transmits with sufficiently high but not too high power since the latter would increase the interference to other users in the network. In both cases, a parameterized open loop combined with a closed loop mechanism is used. Roughly, the open loop part is used to set a point of operation, around which the closed loop component operates. Different parameters (targets and 'partial compensation factors') for user and control plane are used.

Considering uplink power control in more detail, for PUSCH the mobile terminal sets the output power according to:

$$P_{PUSCHc}(i) = \min\{P_{MAXc}, 10 \log_{10}(M_{PUSCHc}(i)) + P_{O\_PUSCHc}(j) + \alpha_c \cdot PL_c + \Delta_{TFc}(i) + f_c(i)\}[\text{dBm}],$$

where $P_{MAXc}$ is the maximum transmit power for the carrier, $M_{PUSCHc}(i)$ is the number resource blocks assigned, $P_{O\_PUSCHc}(j)$ and $\alpha_c$ control the target received power, $PL_c$ is the estimated pathloss, $\Delta_{TFc}(i)$ is transport format compensator and $f_c(i)$ is the a UE specific offset or 'closed loop correction' (the function $f_c$ may represent either absolute or accumulative offsets). The index c numbers the component carrier and is only of relevance for Carrier Aggregation. The PUCCH power control has a similar description.

The closed loop power control can be operated in two different modes either accumulated or absolute. Both modes are based on TPC, a command which is part of the downlink control signaling. When absolute power control is used, the closed loop correction function is reset every time a new power control command is received. When accumulated power control is used, the power control command is a delta correction with regard to the previously accumulated closed loop correction. The accumulated power control command is defined as $f_c(i)=f_c(i-1)+\delta_{PUSCHc}(i-K_{PUSCH})$, where, $\delta_{PUSCHc}$ is the TPC command received in $K_{PUSCH}$ subframe before the current subframe i and $f_c(i-1)$ is the accumulated power control value. The absolute power control has no memory, i.e. $\delta_c(i)=\delta_{PUSCHc}(i-K_{PUSCH})$. The PUCCH power control has in principle the same configurable parameters with the exception that PUCCH only has full pathloss compensation, i.e. does only cover the case of $\alpha=1$.

In LTE Rel-10, the base station may configure the UE to send power headroom reports associated with the PUSCH periodically or when the change in pathloss exceeds a configurable threshold. The power headroom reports indicate how much transmission power the UE has left for a subframe i, i.e., the difference between the nominal UE maximum transmit power and the estimated required power. The reported value is in the range of 40 to −23 dB, where a negative value shows that the UE did not have enough power to conduct the transmission. The UE power headroom $PH_c$ in dB for subframe i is defined as:

$$PH_c(i)=P_{CMAXc}-\{10\log_{10}(M_{PUSCHc}(i))+P_{O\_PUSCHc}(j)+\alpha_c(j)\cdot PL_c+\Delta_{TFc}(i)+f_c(i)\} \quad (1)$$

where $P_{CMAXc}$, $M_{PUSCHc}(i)$, $P_{O\_PUSCHc}(j)$, $\alpha_c(j)$, $PL_c$, $\Delta_{TFc}(i)$ and $f_c(i)$ is defined above.

It is also possible to enable separate power headroom reports (PHR) for the PUCCH if PUCCH can be simultaneously transmitted with the PUSCH. In such cases either a separate PHR is provided for PUCCH (in dB)

$$PH_{PUCCHc}(i)=P_{CMAXc}-\{P_{O\_PUCCHc}+PL_c+h_c(n_{CQI},n_{HARQ})+\Delta_{F\_PUCCHc}(F)+g_c(i)\}, \quad (2)$$

or it is combined with PUSCH (in dB), $$PH_{PUSCH\_and\_PUCCH}(i) = P_{CMAX,c}(i) - 10\log_{10} \quad (3)$$
$$\left(10^{(10\log_{10}(M_{PUSCH\cdot c}(i))+P_{O\_PUSCH\cdot c}(j)+\alpha_c(j)\cdot PL_c+\Delta_{TF\cdot c}(i)+f_c(i))/10} + 10^{(P_{O\_PUCCH}+PL_c+h(n_{CQI},n_{HARQ},n_{SR})+\Delta_{P\_PUCCH}(F)+\Delta_{TxD}(F')+g(i))/10}\right)$$

The parameter definitions associated with these equations are specified above.

The LTE Rel-8 standard has recently been standardized, supporting bandwidths up to 20 MHz. However, in order to meet the upcoming IMT-Advanced requirements, 3GPP has initiated work on LTE-Release 10. One aspect of LTE Rel-10 is to support bandwidths larger than 20 MHz in a manner which assures backward compatibility with LTE Rel-8/9, including spectrum compatibility. This implies that an LTE Rel-10 carrier, which is wider than 20 MHz, should appear as a number of LTE carriers to an LTE Rel-8/9 terminal. Each such carrier can be referred to as a component carrier (CC). Component carriers are also referred to as cells, more specifically primary component carriers are referred to as primary cells or PCell and secondary component carriers are referred to as secondary cells or SCells.

For early LTE Rel-10 deployments, it is expected that there will be a smaller number of LTE Rel-10-capable terminals in operation as compared to many LTE legacy terminals in operation. Therefore, it is desirable to assure an efficient use of a wide carrier also for legacy terminals, i.e., that it is possible to implement carriers where legacy terminals can be scheduled in all parts of the wideband LTE-Advanced carrier. One way to achieve this objective is by means of carrier aggregation (CA). Carrier aggregation implies that, for example, an LTE Rel-10 terminal can receive multiple component carriers, where the component carriers have, or at least have the possibility to have, the same structure as a Rel-8 carrier. An example of carrier aggregation is illustrated in FIG. 5, wherein five 20 MHz component carriers 10 are aggregated to form a single wideband carrier.

The number of aggregated CCs, as well as the bandwidth of the individual CC, may be different for uplink and downlink. A symmetric configuration refers to the case where the number of CCs in downlink and uplink is the same, whereas an asymmetric configuration refers to the case that the number of CCs is different. It is important to note that the number of CCs configured in a cell area may be different from the number of CCs seen or used by a terminal: A terminal may for example support more downlink CCs than uplink CCs, even though the network is configured with the same number of uplink and downlink CCs.

Applying the LTE Rel-8 framework for Power Headroom Reporting to Carrier Aggregation in, e.g., LTE Rel-10, would imply that a PHR for a specific component carrier would be sent on that component carrier itself. Furthermore it is unclear whether a PHR would only be transmitted on a component carrier if the terminal has PUSCH resources granted on that component carrier. In RAN2 it is proposed to extend this framework so that PH for one component carrier can be transmitted on another component carrier. This would enable to report rapid path loss changes on one component carrier as soon as the terminal has PUSCH resources granted on any configured UL component carrier. More specifically, a path loss change by more than dl-PathlassChange dB on any component carrier triggers transmission of a PHR on any (the same or another) component carrier for which the terminal has PUSCH resources granted.

However, these mechanisms for power headroom reporting in systems employing carrier aggregation suffer from certain potential drawbacks. For example, the calculation of PHR is tied to a given PUSCH format. A PHR for a component carrier without PUSCH resources can therefore not be determined due to lack of a valid PUSCH format. The same applies for a PUCCH PHR. Accordingly, it would be desirable to provide methods, systems, devices and software which address these potential deficiencies.

SUMMARY

Power headroom reporting and report handling are discussed in the context of a Physical Uplink Shared Channel (PUSCH), on which a user equipment (UE) has no valid uplink grant, and a Physical Uplink Control Channel (PUCCH) on which a UE has no transmission. Under these circumstances, it is not possible to directly calculate one or more parameters which are used to calculate power headroom. Accordingly, exemplary embodiments provide for predetermined, known values to be used by the UE to calculate the power headroom, and by the eNodeB to understand the meaning of a received power headroom report.

According to a first exemplary embodiment, a method for power headroom reporting in a radiocommunication system for a component carrier on which a user equipment (UE) has no valid uplink grant for the Physical Uplink Shared Channel (PUSCH), includes the steps of calculating, by the UE, a power headroom for the component carrier on which the UE has no valid uplink grant, using at least one known value for at least one parameter associated with the PUSCH to calculate the power headroom since a value cannot be obtained for the at least one parameter, wherein the at least one known value is a value known by both the UE and an eNodeB to which the UE is connected, wherein the at least one parameter includes at least one of: (a) $M_{PUSCHc}(i)$ which represents a number of resource blocks assigned to the PUSCH on the component carrier when the UE has a valid uplink grant, (b) $\Delta_{TFc}(i)$, which represents a transport format compensator associated with the PUSCH on the component carrier when the UE has a valid uplink grant, and (c) $\delta_{PUSCHc}(i-K_{PUSCH})$, which represents a transmit power control command associated with the PUSCH on the component carrier when the UE has a valid uplink grant, and transmitting, by the UE, a power headroom report based on the calculated power headroom.

According to a second exemplary embodiment, a user equipment (UE) includes a processor configured to operate to perform power headroom reporting for a component carrier in a mode during which the UE has no valid uplink grant for a Physical Uplink Shared Channel (PUSCH) by calculating a power headroom for the component carrier on which the UE has no valid uplink grant, using at least one known value for at least one parameter associated with the PUSCH to calculate the power headroom since a value cannot be obtained for the at least one parameter, wherein the at least one known value is a value known by both the UE and an eNodeB to which the UE is connected, wherein the at least one parameter includes at least one of: (a) $M_{PUSCHc}(i)$ which represents a number of resource blocks assigned to the PUSCH on the component carrier when the UE has a valid uplink grant, (b) $\Delta_{TFc}(i)$, which represents a transport format compensator associated with the component carrier when the UE has a valid uplink grant, and (c) $\delta_{PUSCHc}(i-K_{PUSCH})$, which represents a transmit power control command associated with the component carrier when the UE has a valid uplink grant; and a transceiver configured to transmit a power headroom report based on the calculated power headroom.

According to a third exemplary embodiment, a method for power headroom reporting in a radiocommunication system for a component carrier on which a user equipment (UE) has no current transmission on the Physical Uplink Control Channel (PUCCH) includes the steps of calculating, by the UE, a power headroom for the component carrier on which the UE has no transmission on the PUCCH, using at least one known value for at least one parameter associated with the PUCCH to calculate the power headroom since a value cannot be obtained for the at least one parameter, wherein the at least one known value is a value known by both the UE and an eNodeB to which the UE is connected, wherein the at least one parameter includes at least one of: (a) $h_c(n_{CQI}, n_{HARQ})$, which represents an amount by which power is adapted to the number of control information bits that are transmitted on the PUCCH on the component carrier when the UE has a transmission on the PUCCH, (b) $\Delta_{F\_PUCCHc}(F)$ which represents a relative performance difference between PUCCH format 1a and the PUCCH on the component carrier when the UE has a transmission on the PUCCH, and (c) $\delta_{PUCCHc}(i-k_{PUSCH})$, which represents a transmit power control command associated with the PUCCH on the component carrier when the UE has a transmission on the PUCCH; and transmitting, by the UE, a power headroom report based on the calculated power headroom.

According to a fourth exemplary embodiment, a user equipment (UE) includes a processor configured to perform power headroom reporting for a component carrier on which a user equipment (UE) has no current Physical Uplink Control Channel (PUCCH) transmission by calculating a power headroom for the component carrier on which the UE has no PUCCH transmission, using at least one known value for at least one parameter associated with the PUCCH to calculate the power headroom since a value cannot be obtained for the at least one parameter, wherein the at least one known value is a value known by both the UE and an eNodeB to which the UE is connected, wherein the at least one parameter includes at least one of: (a) $h_c(n_{CQI}, n_{HARQ})$, which represents an amount by which power is adapted to the number of bits that are transmitted on said component carrier when the UE has a transmission on the PUCCH, (b) $\Delta_{F\_PUCCHc}(F)$ which represents a relative performance difference between PUCCH 1a and the at least one known value for the at least one parameter of the PUCCH associated with the component carrier when the UE has a transmission on the PUCCH, and (c) $\delta_{PUCCHc}(i-k_m)$, which represents a transmit power control command associated with the component carrier when the UE has a transmission on the PUCCH; and a transceiver configured to transmit a power headroom report based on the calculated power headroom.

According to a fifth exemplary embodiment, a method for power headroom report handling in a radiocommunication system for a component carrier on which a user equipment (UE) has no valid uplink grant for the Physical Uplink Shared Channel (PUSCH), includes the steps of receiving, by an eNodeB, a power headroom report for the component carrier on which the UE has no valid uplink grant, wherein the power headroom report was calculated using at least one known value for at least one parameter associated with the PUSCH since a value could not be obtained for the at least one parameter, wherein the at least one known value is a value known by both the UE and the eNodeB, wherein the at least one parameter includes at least one of: (a) $M_{PUSCHc}$, which represents a number of resource blocks assigned to the PUSCH on the component carrier when the LIE has a valid uplink grant, (b) $\Delta_{TFc}(i)$, which represents a transport format compensator associated with the PUSCH on the component carrier when the UE has a valid uplink grant, and (c) $\delta_{PUSCHc}(i-K_{PUSCH})$, which represents a transmit power control command associated with the PUSCH on the component carrier when the UE has a valid uplink grant.

According to a sixth exemplary embodiment, an eNodeB includes a processor configured to receive a power headroom report for a component carrier of a Physical Uplink Shared Channel (PUSCH) in a mode during which a UE has no valid uplink grant, wherein the power headroom report was calculated by using at least one known value for at least one parameter associated with the PUSCH since a value cannot be obtained for the at least one parameter, wherein the at least one known value is a value known by both the UE and the eNodeB, wherein the at least one parameter includes at least one of: (a) $M_{PUSCHc}(i)$, which represents a number of resource blocks assigned to the PUSCH on the component carrier when the UE has a valid uplink grant, (b) $\Delta_{TFc}(i)$, which represents a transport format compensator associated with the component carrier when the UE has a valid uplink grant, and (c) $\delta_{PUSCHc}(i-K_{PUSCH})$, which represents a transmit power control command associated with the component carrier when the UE has a valid uplink grant; and a transceiver configured to transmit an uplink power control power headroom command based on the power headroom report.

According to a seventh exemplary embodiment, a method for power headroom report handling in a radiocommunication system for a component carrier on which a user equipment (UE) has no current transmission on the Physical Uplink Control Channel (PUCCH), the method including the steps of receiving, by an eNodeB, a power headroom report for the component carrier on which the UE has no transmission on the PUCCH, wherein the power headroom report was calculated using at least one known value for at least one parameter associated with the PUCCH since a value cannot be obtained for the at least one parameter; wherein the at least one known value is a value known by both the UE and the eNodeB, wherein the at least one parameter includes at least one of: (a) $h_c(n_{CQI}, n_{HARQ})$, which represents an amount by which power is adapted to the number of control information bits that are transmitted on said PUCCH on the component carrier when the UE has a transmission on the PUCCH, (b) $\Delta_{F\_PUCCHc}(F)$, which represents a relative performance difference between PUCCH format 1a and the PUCCH on the component carrier when the UE has a transmission on the PUCCH, and (c) $\delta_{PUCCHc}(i-k_m)$, which represents a transmit power control command associated with the PUCCH on the component carrier when the UE has a transmission on the PUCCH.

According to an eighth exemplary embodiment, an eNode B includes a processor configured to receive a power headroom report for a component carrier on which a user equipment (UE) has no current Physical Uplink Control Channel (PUCCH) transmission, wherein the power headroom report was calculated using at least one known value for at least one parameter associated with the PUCCH since a value could not be obtained for the at least one parameter, wherein the at least one known value is a value known by both the UE and the eNodeB, wherein the at least one parameter includes at least one of: (a) $h_c(n_{CQI}, n_{HARQ})$, which represents an amount by which power is adapted to the number of bits that are transmitted on said component carrier when the UE has a transmission on the PUCCH, (b) $\Delta_{F\_PUCCHc}(F)$, which represents a relative performance difference between PUCCH 1a and the reference format of the PUCCH associated with the component carrier when the UE has a transmission on the PUCCH, and (c) $\delta_{PUCCHc}(i-k_m)$, which represents a transmit power control command associated with the component carrier when the UE has a transmission on the PUCCH; and a transceiver configured to transmit an uplink power control command based on the power headroom report.

ABBREVIATIONS/ACRONYMS

ACK Positive ACKnowledgement
ARQ Automatic Repeat Request
CA Carrier Aggregation
CC Component Carrier
CQI Channel Quality Indicator
DFT Discrete Fourier Transform
eNB see eNodeB
eNodeB Evolved NodeB
LTE Long Term Evolution
NAK/NACK Negative ACKnowledgement
PH Power Headroom
PHR Power Headroom Reporting
PUCCH Physical Uplink Control Channel
PUSCH Physical Uplink Shared Channel
RAN Radio Access Network
TPC Transmission Power Control

BRIEF DESCRIPTION OF THE DRAWINGS

The exemplary embodiments described below will be understood, in conjunction with the drawings submitted herewith in which.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims. The following embodiments are discussed, for simplicity, with regard to the terminology and structure of LTE systems. However, the embodiments to be discussed next are not limited to LTE systems but may be applied to other telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
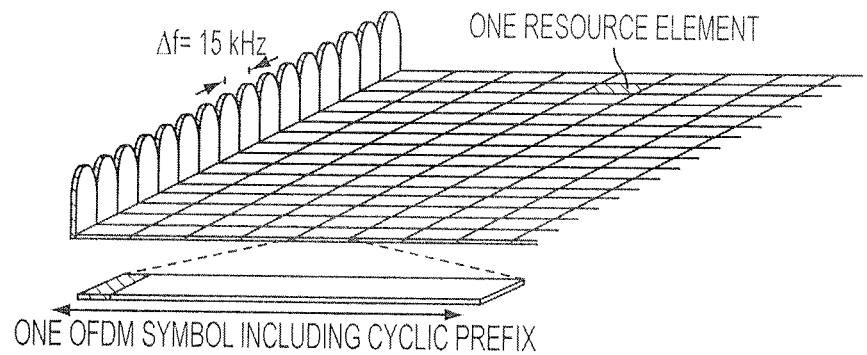
FIG. 1 represents an LTE OFDM downlink signal in the frequency/time domain.
Figure 2:
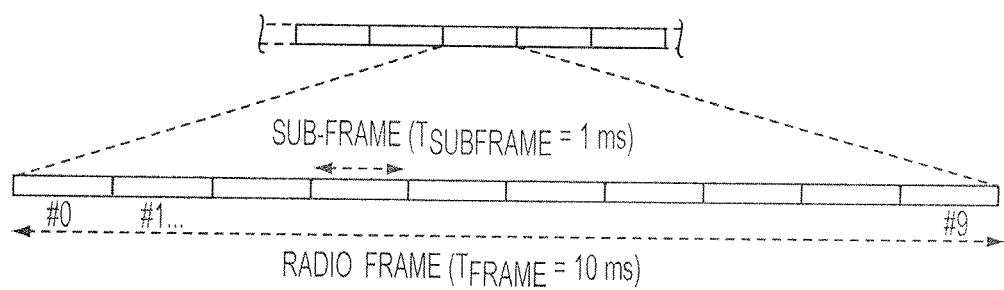
FIG. 2 shows a subframe associated with an LTE OFDM signal in the time domain.
Figure 3:
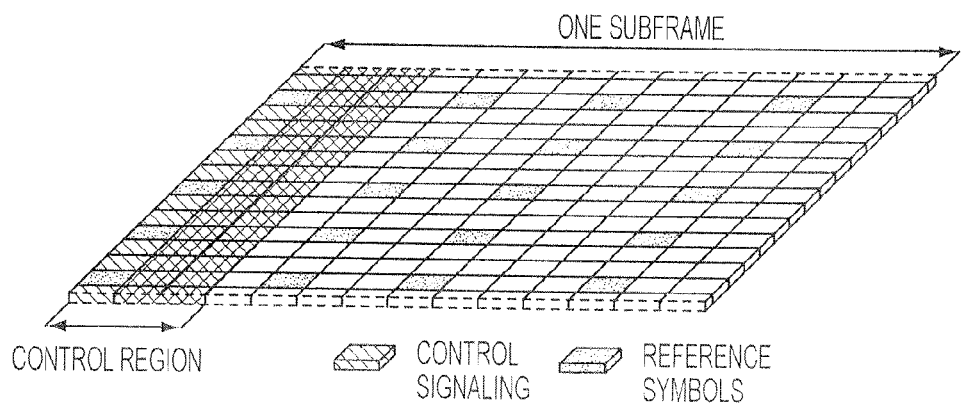
FIG. 3 illustrates a downlink system with 3 OFDM symbols as the control region.
Figure 4:
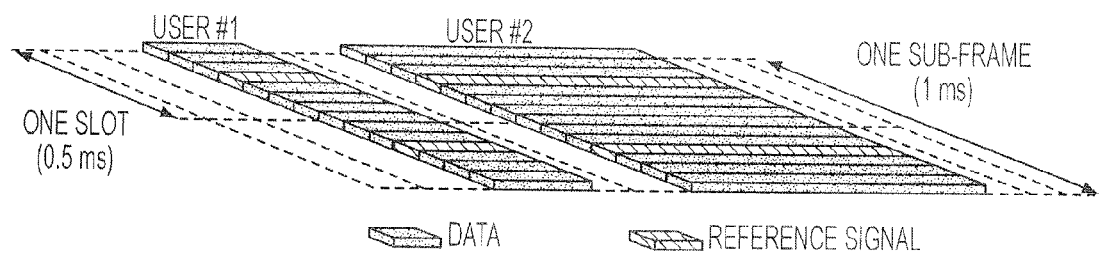
FIG. 4 shows consecutive uplink assignments in an LTE system.
Figure 5:
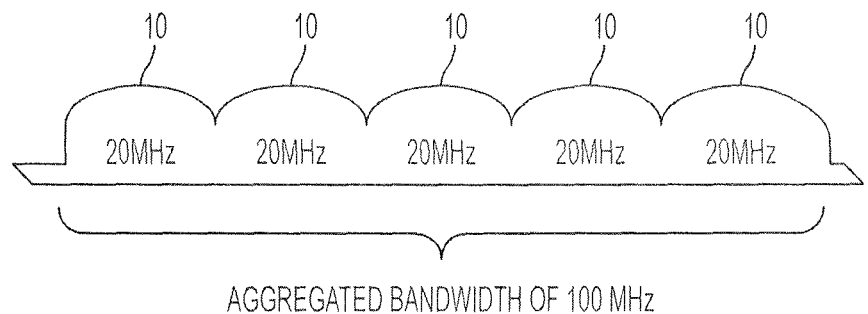
FIG. 5 depicts carrier aggregation.
Figure 6:
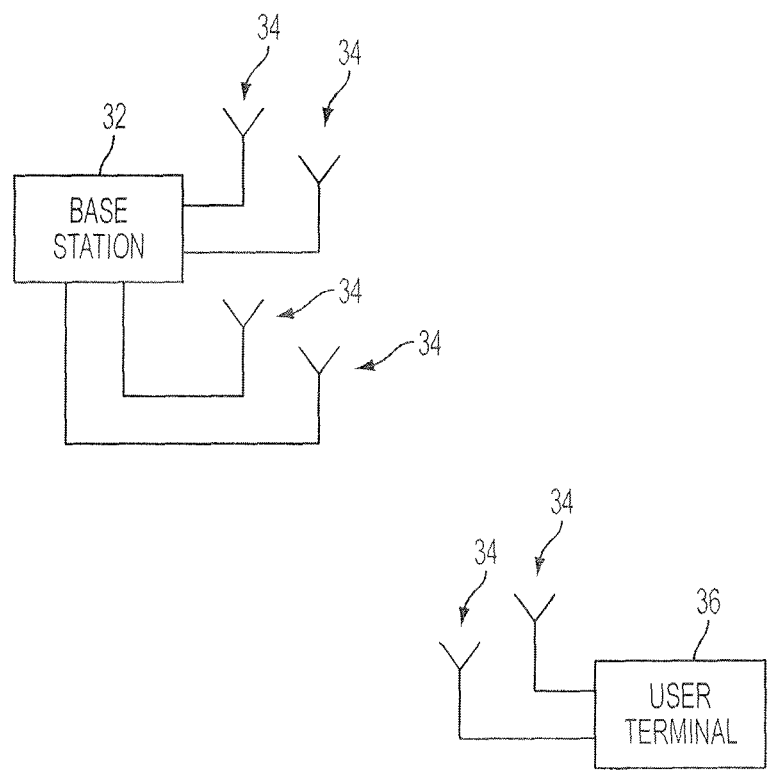
FIG. 6 illustrates a base station and a user terminal which can be used to implement aspects of exemplary embodiments.
Figure 7:
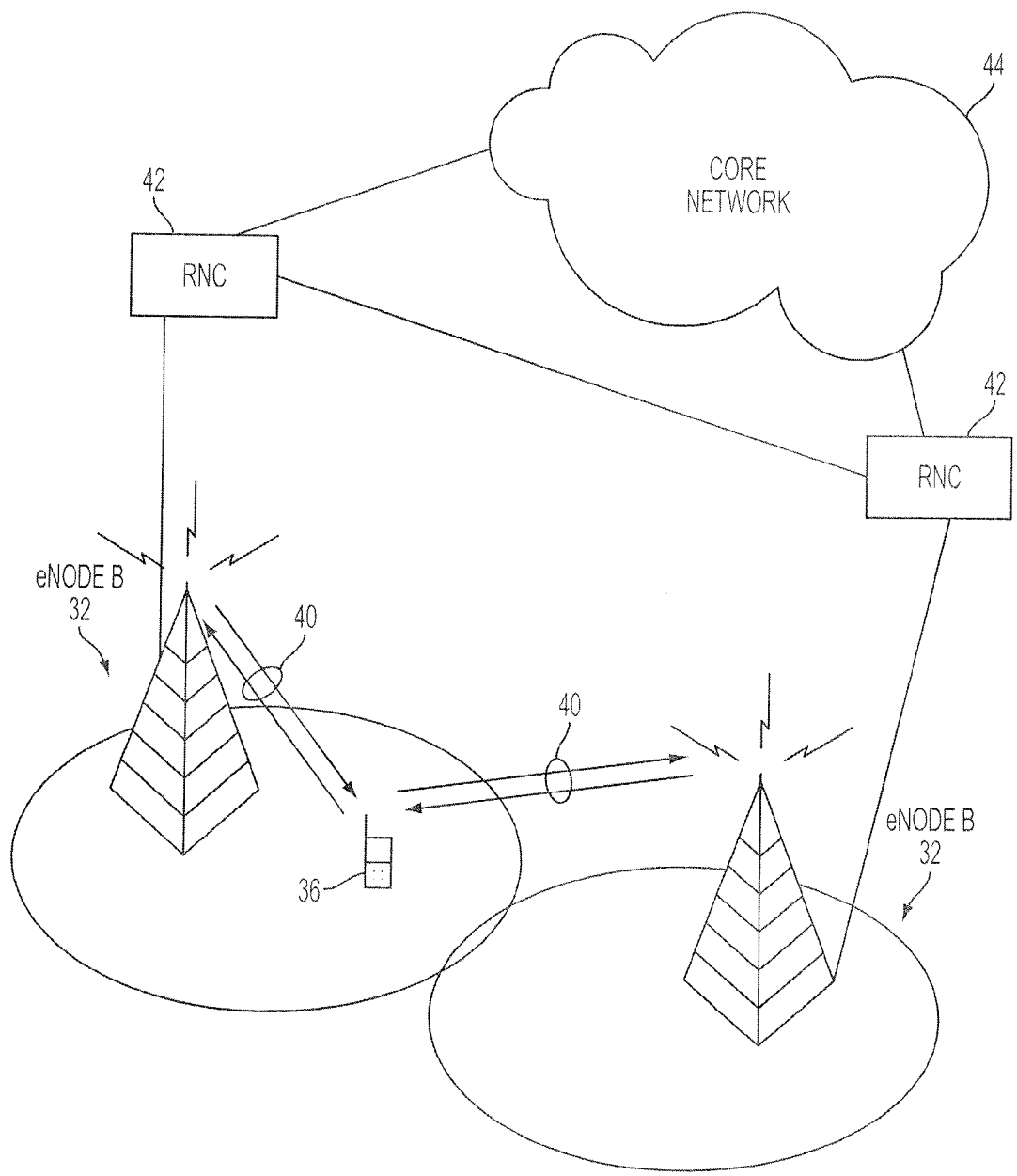
FIG. 7 shows a communication system in which exemplary embodiments can be implemented.

To provide some context for the following exemplary embodiments related to power headroom reporting and associated signaling, consider the exemplary radiocommunication system as shown from two different perspectives in FIGS. 6 and 7, respectively. To increase the transmission rate of the systems, and to provide additional diversity against fading on the radio channels, modern wireless communication systems include transceivers that use multi-antennas (often referred to as a MIMO systems). The multi-antennas may be distributed to the receiver side, to the transmitter side and/or provided at both sides as shown in FIG. 6. More specifically, FIG. 6 shows a base station 32 having four antennas 34 and a user terminal (also referred to herein as "user equipment" or "UE") 36 having two antennas 34. The number of antennas shown in FIG. 6 is exemplary and is not intended to limit the actual number of antennas used at the base station 32 or at the user terminal 36 in the exemplary embodiments to be discussed below.

Additionally, the term "base station" is used herein as a generic term. As will be appreciated by those skilled in the art, in the LTE architecture an evolved NodeB (eNodeB) may correspond to the base station, i.e., a base station is a possible implementation of the eNodeB. However, the term "eNodeB"

is also broader in some senses than the conventional base station since the eNodeB refers, in general, to a logical node. The term "base station" is used herein as inclusive of a base station, a NodeB, an eNodeB or other nodes specific for other architectures. An eNodeB in an LTE system handles transmission and reception in one or several cells, as shown for example in FIG. 7.

FIG. 7 shows, among other things, two eNodeBs 34 and one user terminal 36. The user terminal 36 uses dedicated channels 40 to communicate with the eNodeB(s) 34, e.g., by transmitting or receiving RLC PDU segments as according to exemplary embodiments described below. The two eNodeBs 34 are connected to corresponding Radio Network Controllers (RNC) 42. Although not shown as such in FIG. 7, it will be appreciated that each RNC 42 may control more than one eNodeB 32. The RNCs 42 are connected to a Core Network 44. In some network, e.g. LTE, the RNC is omitted.

Figure 8:
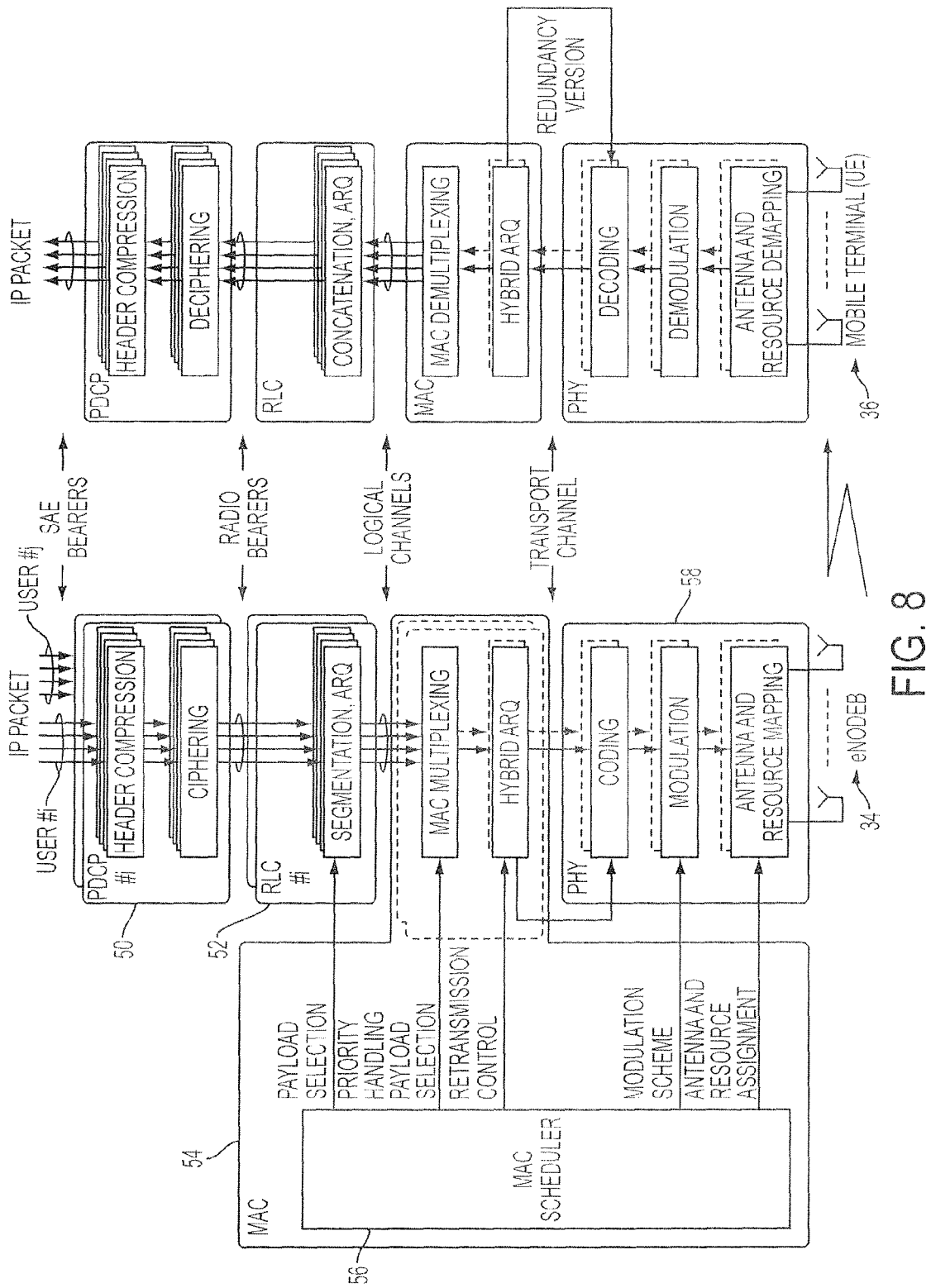
FIG. 8 illustrates processing elements within an eNodeB and a mobile terminal or UE in which exemplary embodiments can be implemented.

One exemplary LTE architecture for processing data for transmission by an eNodeB 34 to a UE 36 (downlink) is shown in FIG. 8. Therein, data to be transmitted by the eNodeB 34 (e.g., IP packets) to a particular user is first processed by a packet data convergence protocol (PDCP) entity 50 in which the IP headers are (optionally) compressed and ciphering of the data is performed. The radio link control (RLC) entity 52 handles, among other things, segmentation of (and/or concatenation of) the data received from the PDCP entity 50 into protocol data units (PDUs). Additionally, the RLC entity 52 provides a retransmission protocol (ARQ) which monitors sequence number status reports from its counterpart RLC entity in the UE 36 to selectively retransmit PDUs as requested. The medium access control (MAC) entity 54 is responsible for uplink and downlink scheduling via scheduler 56, as well as the hybrid-ARQ processes discussed above. A physical (PHY) layer entity 58 takes care of coding, modulation, and multi-antenna mapping, among other things. Each entity shown in FIG. 8 provides outputs to, and receives inputs from, their adjacent entities by way of bearers or channels as shown. The reverse of these processes are provided for the UE 36 as shown in FIG. 8 for the received data, and the UE 36 also has similar transmit chain elements as the eNB 34 for transmitting on the uplink toward the eNB 34.

Having described some exemplary LTE devices in which aspects of the power headroom reporting according to exemplary embodiments can be implemented, the discussion now returns to consideration of power headroom reporting in the context of carrier aggregation. As mentioned above, previous system implementations have not required consideration of power headroom reporting in conjunction with carrier aggregation which implies having multiple CCs of different frequencies and frequency bands per UE. For example, the decision of when to send PHRs, i.e., the triggering of power headroom reporting by the UE, can be considered. As background, in LTE Rel-8/9, the following PHR related parameters can be configured per UE; prohibitPHR-Timer, periodicPHR-Timer and dl-PathlossChange. In Rel-8/9, a PHR report is created and sent in a TTI with an available PUSCH grant when either the periodicPHR-Timer expires or when the prohibitPHR-Timer expires and the change in measured DL pathloss since the last PHR was transmitted exceeds the dl-PathlossChange threshold. A PHR report shall also be sent if the PHR reporting functionality is (re)configured by higher layers.

In LTE Rel-10, where there may be multiple CCs of different frequencies and frequency bands per UE, the radio quality and pathloss will most likely differ between different CCs. However, even though the pathloss may differ between different CCs there may be no benefit of comparing each CC pathloss to different path loss change thresholds when deciding if a PHR should be transmitted upon expiry of the prohibitPHR-Timer. Moreover, there may be no benefit that justifies having the prohibitPHR-Timer and the periodicPHR-Timer configured per CC. Thus according to one exemplary embodiment, the triggering variables associated with when a UE makes its power headroom reports to an eNB, i.e., prohibitPHR-Timer, periodicPHR-Timer, and dl-PathlossChange, can be the same for all CC's associated with a user equipment, i.e., be per UE. Alternatively, some or all of these variables can differ from CC to CC for a particular UE.

In addition to when to send PHRs from a UE to an eNB, exemplary embodiments consider the content of PHRs. In LTE Rel-8/9 there was no ambiguity to the PHR content since there was only one carrier to report PHR for, either when the periodic PHR timer had expired or when the DL pathloss change had exceeded the dl-pathlossChange threshold upon expiry of the prohibitPHR-Timer, as long as the UE had an available PUSCH grant. For systems which include carrier aggregation, when it comes to deciding which UL CC to provide PHR information about to the eNB, the following different options have been identified for deciding which UL CCs PHR information should be reported upon expiry of each respective PHR timer.

Upon expiry of the prohibitPHR-Timer:
  Transmit PHR only for the UL CCs where the corresponding active DL CC has exceeded the dl-pathlossChange threshold and for which the UE has an available UL PUSCH grant.
  Transmit PHR for all UL CCs where the corresponding active DL CC has exceeded the di-pathlossChange threshold
  If at least one active DL CC has exceeded the dl-PathlossChange threshold, transmit PHR only for the UL CCs which have a corresponding active DL CC and an available PUSCH grant.
  If at least one active DL CC has exceeded the dl-PathlossChange threshold, transmit PHR for all UL CCs which have a corresponding active DL CC.

Upon expiry of the periodicPHR-Timer:
  Transmit PHR only for the UL CCs which have a corresponding active DL CC and an available PUSCH grant.
  Transmit PHR for all UL CCs which have a corresponding active DL CC.

If activation of UL SCCs is implemented, it may be beneficial to allow PHRs to be transmitted for any active UL CC, even if no PUSCH grant is available. This may make sense since it can be assumed that the eNB has activated the UL CC with the intention to utilize that channel and that the eNB would therefore want to have a PHR report for that channel in order to get the full picture of the power situation, even if no specific grant has been given for the specific TTI. Moreover, it may also be desirable for UEs to send PHRs even for those UL CCs whose corresponding active DL CC has not exceeded the threshold to provide the eNB with a complete power status. Thus according to one exemplary embodiment, the UE should always report PHR for all activated UL CCs regardless of how a PHR was triggered. According to other exemplary embodiments, the UE may only report PHR for one or some of the cases discussed above.

However, not all of the information which is needed for calculating the PHR will be available if no PUSCH grant is available. Thus, according to exemplary embodiments, to enable PHR for a component carrier without a valid PUSCH grant, a default PUSCH format can be used. If both the eNodeB and the terminal are aware of the same PUSCH reference configuration (e.g. configured by the network or standardized), the power headroom based on a desired PUSCH format can be re-calculated in the eNodeB and used for future scheduling decisions. Alternatively, instead of a reference PUSCH format, other exemplary embodiments reuse the PUSCH format of the component carrier carrying the PHR as a reference. In addition to the PUSCH format, the current status of the power control loop also impacts the PHR. According to exemplary embodiments, the respective status of the PUSCH and PUCCH power control loop on the component carrier for which the PHR is being generated can be used for PUSCH and PUCCH PHR. An analysis of equation (1), described in the Background section above, for PHR of component carrier c shows that the parameters can be categorized into the following groups:

1. Parameters that depend on the PUSCH format. The parameters $M_{PUSCHc}(i)$ and $\Delta_{TFc}(i)$ belong in this category. On a component carrier without granted PUSCH resources these parameters are not available.

2. Power control loop parameters. The current state of the power control loop is given by the parameter $f_c(i)$. For absolute and accumulative power control loops, these states can be expressed as:
$f_c(i) = \delta_{PUSCHc}(i-K_{PUSCH})$ and $f_c(i) = f_c(i-1) + \delta_{PUSCHc}(i-K_{PUSCH})$, respectively. $\delta_{PUSCHc}(i-K_{PUSCH})$ is the TPC command received in the UL grant. However, on a component carrier without an UL grant $\delta_{PUSCHc}(i-K_{PUSCH})$ is not available.

3. Component carrier specific parameters. $P_{CMAXc}$, $P_{O\_PUSCHc}(j)$ and $\alpha_c(j)$ are given by higher layers. $PL_c$ is the pathloss associated with component carrier c. From these categories, it can be seen that on a component carrier without a valid UL grant, the parameters $M_{PUSCHc}(i)$, $\Delta_{TFc}(i)$, and $\delta_{PUSCHc}(i-K_{PUSCH})$ are not available. In order to enable calculation and subsequent reporting of PH for a component carrier c without valid UL grant exemplary embodiments substitute, for these unknown parameters, values which are known to both the eNodeB and the terminal. The resulting PHR value allows the eNodeB to determine the power headroom that would occur given a certain PUSCH format.

According to a first exemplary embodiment, a reference PUSCH format is defined that is known by both the eNodeB and the terminal and is used by the terminal to calculate PH for a component carrier c without an UL grant. Such a reference format could contain values for $M_{PUSCHc}(i)$, $\Delta_{TFc}(i)$, and $\delta_{PUSCHc}(i-K_{PUSCH})$, e.g.
$M_{PUSCHc}(i)=10$, or, alternatively, equal to 1,
$\Delta_{TFc}(i)=0$ dB, and
$\delta_{PUSCHc}(i-K_{PUSCH})=0$ dB.
It will be appreciated that the aforedescribed, numerical values for these parameters are purely illustrative. The reference format parameter values can be fixed values that are defined in the standard or values signalled from the network to the UE. Alternatively other parameters can be provided in the reference configuration which enable calculation of $M_{PUSCHc}(i)$, $\Delta_{TFc}(i)$, and $\delta_{PUSCHc}(i-K_{PUSCH})$.

According to a second exemplary embodiment the parameters $M_{PUSCHc}(i)$, $\Delta_{TFc}(i)$, and $\delta_{PUSCHc}(i-K_{PUSCH})$ are taken from a component carrier c' that e.g. is the component carrier that will be used to transmit the power headroom report determined for component carrier c or the uplink primary component carrier (UL PCC), i.e.
$M_{PUSCHc}(i)=M_{PUSCHc'}(i)$
$\Delta_{TFc}(i)=\Delta_{TFc'}(i)$, and
$\delta_{PUSCHc}(i-K_{PUSCH})=\delta_{PUSCHc'}(i-K_{PUSCH})$ According to a third exemplary embodiment, some of these otherwise unknown parameters are taken from a reference configuration and some parameters are taken from the component carrier c' used to transmit the power headroom report determined for component carrier c. One example of this technique could be to reuse $M_{PUSCHc}(i)$ from the component carrier c' whereas $\Delta_{TFc}(i)$ and $\delta_{PUSCHc}(i-K_{PUSCH})$ are used from a reference configuration, e.g.
$M_{PUSCHc}(i)=M_{PUSCHc'}(i)$
$\Delta_{TFc}(i)=0$ dB, and
$\delta_{PUSCHc}(i-K_{PUSCH})=0$ dB.

In a fourth exemplary embodiment, the parameters $M_{PUSCHc}(i)$, $\Delta_{TFc}(i)$, and $\delta_{PUSCHc}(i-K_{PUSCH})$ are taken from previous PUSCH transmissions/grants, wherein the previous PUSCH transmission/grant can be a PUSCH transmission/grant on component carrier c or on component carrier c' that e.g. is the component carrier that will be used to transmit the power headroom report determined for component carrier c or the uplink primary component carrier (UL PCC). Alternatively c' is the component which had the last PUSCH transmission/grant. If multiple UL component carriers had grants/transmissions in the same subframe this can be combined with another rule, e.g. use that component carrier that will now be used for power headroom reporting.

In a fifth exemplary embodiment, the UE reports a special pre-defined value as the PUSCH PH for component carrier c, indicating the power headroom from a previous PUSCH PH report on component carrier c but with absence of data. The eNB will adjust the previous received PUSCH PH report by adding the data power contribution from the previous received PUSCH PH.

Power headroom reporting for systems employing carrier aggregation according to exemplary embodiments can also be provided for the PUCCH as well as the PUSCH. For example, by applying the same categorization used above for equation (1) also to equation (2) for the PUCCH PH, the following classifications are obtained:

1. Parameters that depend on the PUCCH format. The parameter $h_c(n_{CQI}, n_{HARQ})$ and $\Delta_{F\_PUCCHc}(F)$ belong into this category. On a component carrier without PUCCH transmission these parameters are not available. More specifically, the parameter $\Delta_{F\_PUCCHc}(F)$ defines the relative performance difference between PUCCH 1a and PUCCH format F. The parameter is cell specific signalled and should account for different reciever implementation of the different PUCCH formats. The parameter $h_c(n_{CQI}, n_{HARQ})$ adapts the power to the number of control information bits that are transmitted. For PUCCH 1a/1b this is 0 dB since these formats only support one payload size for the format. However for PUCCH format 2/2a/2b it scales the power with the number of transmitted bits.

2. Power control loop parameters. The current state of the power control loop is given by the parameter $g_c(i)$ which is defined as:

$$g_c(i) = g_c(i-1) + \sum_{m=0}^{M-1} \delta_{PUCCHc}(i-k_m) \cdot \delta_{PUCCHc}(i-k_m)$$

is the TPC command that should be applied to the PUCCH transmission. Without PUCCH transmission not available.

3. Component carrier specific parameters. $P_{CMAXc}$ and $P_{O\_PUCCHc}$ are given by higher layers. $PL_c$ is the pathloss associated with component carrier c. On a component carrier without current PUCCH transmission $h_c(n_{CQI}, n_{HARQ})$, $\Delta_{F\_PUCCHc}(F)$ and $\delta_{PUCCHc}(i-k_m)$ are not available. In order to enable calculation and subsequent reporting of PH for a component carrier c without current PUCCH transmission these parameters can be substituted, in the calculations, with values known to both the eNodeB and the terminal. The resulting PHR value allows the eNodeB to determine the power headroom that would occur given a certain PUCCH transmission.

According to a sixth exemplary embodiment, a reference format is defined that is known by both the eNodeB and the terminal and used by the terminal to calculate PH for a component carrier c without PUCCH transmission. Such a reference format could contain values for $h_c(n_{CQI}, n_{HARQ})$, $\Delta_{F\_PUCCHc}(F)$, and $\delta_{PUCCHc}(i-k_m)$. The reference format parameter values can be fixed values that are defined in the standard or values signalled to from the network to the UE. Alternatively other parameters are provided in the reference configuration which enables calculation of $h_c(n_{CQI}, n_{HARQ})$, $\Delta_{F\_PUCCHc}(F)$, and $\delta_{PUCCHc}(i-k_m)$.

According to a seventh exemplary embodiment the parameters $h_c(n_{CQI}, n_{HARQ})$, $\Delta_{F\_PUCCHc}(F)$, and $\delta_{PUCCHc}(i-k_m)$ are taken from a previous PUCCH transmission wherein the previous PUCCH transmission may be a recent PUCCH transmission on the component carrier c for which the PH is to be determined or a recent PUCCH transmission on the component carrier c', which e.g. can be the component carrier that is used for PH transmission or the uplink primary component carrier (UL PCC).

According to an eighth exemplary embodiment, some of these otherwise unknown parameters are taken from a reference configuration and some of these parameters are taken from the last PUCCH transmission.

The aforedescribed exemplary embodiments independently consider PHR for the PUSCH and PUCCH. These embodiments can be used separately or together. For example, according to another exemplary embodiment, a combined PHR for a component carrier c without current PUCCH transmission and/or valid UL grant can be generated and requires provisioning of parameters $M_{PUSCHc}(i)$, $\Delta_{TFc}(i)$, $\delta_{PUSCHc}(i-K_{PUSCH})$, $h_c(n_{CQI}, n_{HARQ})$, $\Delta_{F\_PUCCHc}(F)$, and $\delta_{PUCCHc}(i-k_m)$. If a valid parameter set for either PUSCH or PUCCH are present only a subset of the listed parameters needs to be provided. Provisioning of the PUSCH and PUCCH parameters can be done according to any of the methods presented above.

The afore-described exemplary embodiments discuss, in part, when to send PHR reports and what those reports can contain. According to other exemplary embodiments, the manner in which those reports are sent to the eNB can be considered. There are at least two options regarding how to report PHR: either including the PHR to the MAC PDU on the UL CC it is reporting for or to allow the PHR to be sent on any UL CC. A least complex solution would probably be to only send PHR on the CC which it is reporting for. However, with this solution, in order to be able to send PHR the UE would need to transmit on all UL CC, even if there is not enough data to fill up all UL CC grants. Allowing the UE to transmit PHR on any CC is slightly more complex, but still beneficial since it would give a more flexible UE implementation and possibly save some RLC segmentation when building the MAC PDUs. It would benefit MAC multiplexing when the amount of data available for transmission fits into a subset of the available UL grants, since there is no requirement to transmit the PHR on the otherwise empty UL CCs. Also, if it should be possible for the UE to transmit PHR reports for UL CCs with an active corresponding DL CC but no PUSCH grant, it may not be possible to restrict the PHR to be sent only on the corresponding CC. To enable the eNB to map the received PHR to a specific CC, a seemingly uncomplicated solution would be to extend the MAC CE with an indicator field pointing out which CC a PHR belongs to. Thus, according to one exemplary embodiment, it the PHR reports are permitted to be transmitted on any UL CC, although the present invention does not exclude the possibility of limiting transmission of the PHR on the UL CC with which it is associated.

Figure 9:
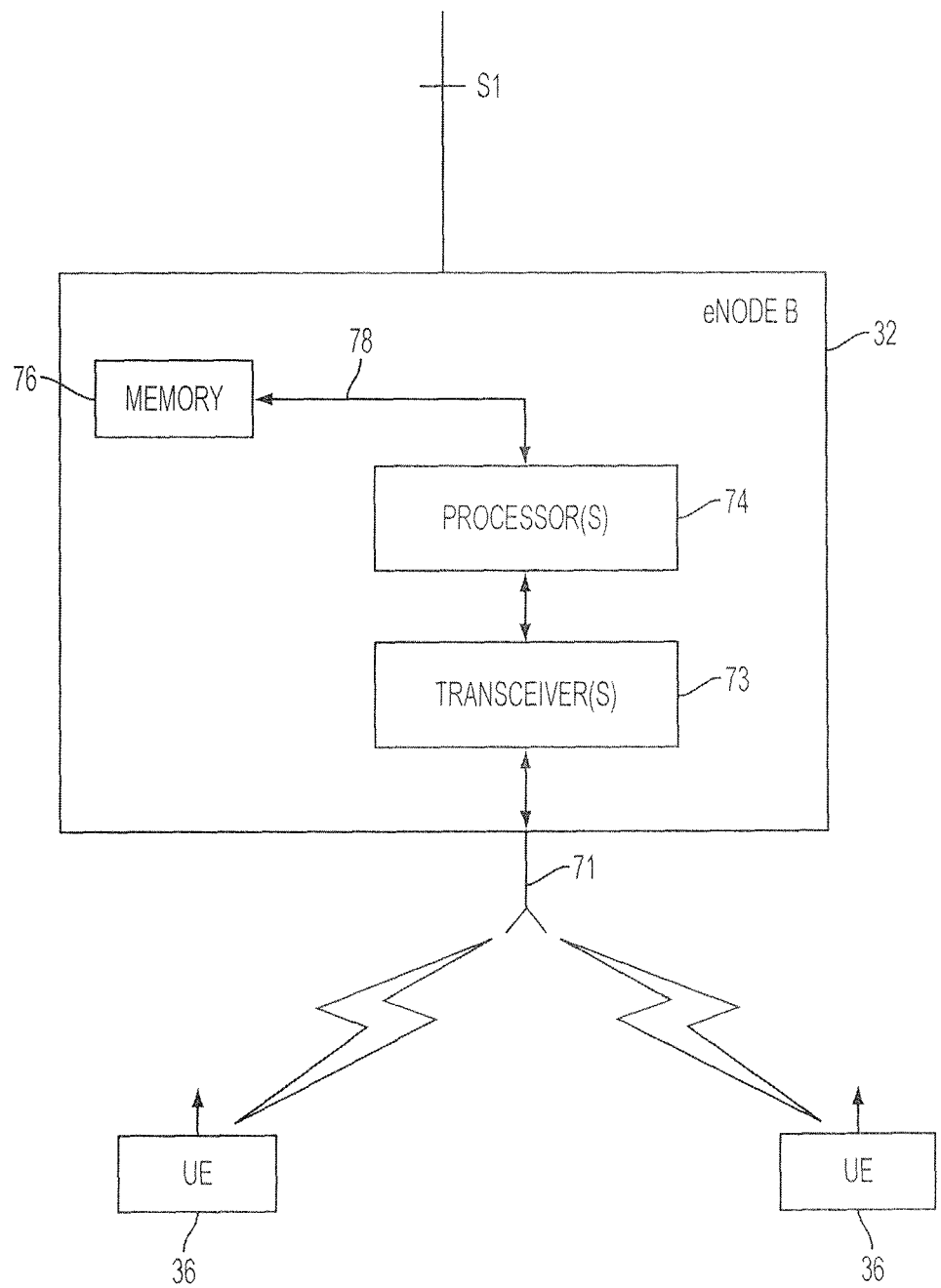
FIG. 9 illustrates additional elements of an eNodeB or UE.

An exemplary base station 32, e.g., an eNodeB, which receives power headroom reports from UEs 36 and transmits data based, in part, on power headroom reports as inputs to its scheduler 56, is generically illustrated in FIG. 9. Therein, the eNodeB 32 includes one or more antennas 71 connected to processor(s) 74 via transceiver(s) 73. The processor 74 is configured to analyze and process signals received over an air interface via the antennas 71, as well as those signals received from core network node (e.g., access gateway) via, e.g., an S1 interface. The processor(s) 74 may also be connected to one or more memory device(s) 76 via a bus 78. Further units or functions, not shown, for performing various operations as encoding, decoding, modulation, demodulation, encryption, scrambling, precoding, etc. may optionally be implemented not only as electrical components but also in software or a combination of these two possibilities as would be appreciated by those skilled in the art to enable the transceiver(s) 72 and processor(s) 74 to process uplink and downlink signals. A similar, generic structure, e.g., including a memory device, processor(s) and a transceiver, can be used (among other things) to implement communication nodes such as UEs 36.

Exemplary embodiments enable PH reporting for component carriers without valid PUSCH resources and/or PUCCH transmissions. In case of rapid path loss changes it is advantageous to provide eNodeB with this information rather as quickly as possible than to wait for valid UL resources on the effected UL component carrier. To better understand how such embodiments can be used to impact the calculations performed for power headroom reporting (PHR), consider the following. So-called Type 1 PHR (in dB) can be calculated using the following equation when PUSCH transmission is occurring:

$$PH_{type1,c}(i) = P_{CMAX,c}(i) - \{10 \; \log_{10}(M_{PUSCHc}(i)) + P_{O\_PUSCH,c}(j) + \alpha_c(j) \cdot PL_c + \Delta_{TF,c}(i) + f_c(i)\}$$

However, when real PUSCH transmissions are not available for the UE, then predetermined, known values can be used by the UE in their place to calculate type 1 PHR, e.g:

$M_{PUSCHc}(i) = 1 \; (10 \log_{10}(M_{PUSCH,c}(i)) = 0)$
$\Delta_{TFc}(i) = 0$
$\delta_{PUSCHc}(i-K_{PUSCH}) = 0$ This has the effect of reducing the first equation to:

$$PH_{type1,c}(i) = P_{CMAX,c}(i) - \{P_{O\_PUSCH,c}(j) + \alpha_c(j) \cdot PL_c + f_c(i)\}$$

Similarly, for so-called type 2 PHR (in dB), the power headroom can be calculated by:

$$PH_{type2}(i) = P_{CMAX,c}(i) - 10\log_{10}\left( 10^{(10\log10(M_{PUSCH \cdot c(i)}) + P_{O\_PUSCH \cdot c}(j) + \alpha_c(j) \cdot PL_c + \Delta_{TF \cdot c}(i) + f_c(i))/10} + 10^{(P_{0\_PUCCH} + PL_c + h(n_{CQI}, n_{HARQ}, n_{SR}) + \Delta_{P\_PUCCH}(F) + \Delta_{T \times D}(F') + g(i))/10} \right)$$

when real PUSCH and PUCCH transmissions are occurring. Alternatively, Type 2 PHR without real PUSCH transmission (i.e. PUSCH reference format is used)

$M_{PUSCHc}(i) = 1 \; (10 \log_{10}(M_{PUSCH,c}(i)) = 0)$
$\Delta_{TFc}(i) = 0$
$\delta_{PUSCHc}(i-K_{PUSCH}) = 0$, thus resulting in the latter equation reducing to:

$$PH_{type2}(i) = P_{CMAX,c}(i) - 10\log_{10}$$

$$\left( 10^{(P_{O\_PUSCH,c}(j)+\alpha_c(j)\cdot PL_c+f_c(i))/10} + 10^{(P_{O\_PUCCH}+PL_c+h(n_{CQI},n_{HARQ},n_{SR})+\Delta_{P\_PUCCH}(F)+\Delta_{TxD}(F')+g(i))/10} \right)$$

Similarly, if there is no real PUCCH transmission occurring, then Type 2 PHR can be calculated using, for example, the following known values:

$h_c(n_{CQI}, n_{HARQ})=0$
$\Delta_{F\_PUCCHc}(F)=0$
$\delta_{PUCCHc}(i-k_m)=0$
$\Delta_{TxD}(F)=0$, resulting in the first PHR 2 equation reducing to:

$$PH_{type2}(i) = P_{CMAX,c}(i) - 10\log_{10}$$

$$\left( 10^{(10\log_{10}(M_{PUSCH,c}(i))+P_{O\_PUSCH,c}(j)+\alpha_c(j)\cdot PL+\Delta_{TF,c}(i)+f_c(i))/10} + 10^{(P_{0\_PUCCH}+PL+g(i))/10} \right)$$

Similarly, type 2 PHR can also be calculated without both real PUSCH and PUCCH transmission (i.e. PUSCH and PUCCH reference formats are used) by using known values such as:

$M_{PUSCHc}(i)=1 (10\log_{10}(M_{PUSCH,c}(i))=0)$
$\Delta_{TFc}(i)=0$
$\delta_{PUSCHc}(i-K_{PUSCH})=0$
$h_c(n_{CQI}, n_{HARQ})=0$
$\Delta_{F\_PUCCHc}(F)=0$
$\delta_{PUCCHc}(i-k_m)=0$
$\Delta_{TxD}(F)=0$, such that the type 2 PHR equation reduces to:

$$PH_{type2}(i) = P_{CMAX,c}(i) - 10\log_{10}\left( 10^{(P_{O\_PUSCH,c}(j)+\alpha_c(j)\cdot PL_c+f_c(i))/10} + 10^{(P_{0\_PUCCH}+PL_c+g(i))/10} \right)$$

The exemplary embodiments thus provide known values for certain PUSCH and/or PUCCH parameters which cannot be otherwise obtained. Accordingly, under these circumstances, such parameters which typically represent actual PUSCH and/or PUCCH parameters, in this case represent "virtual" PUSCH and/or PUCCH parameters.

Figure 10:
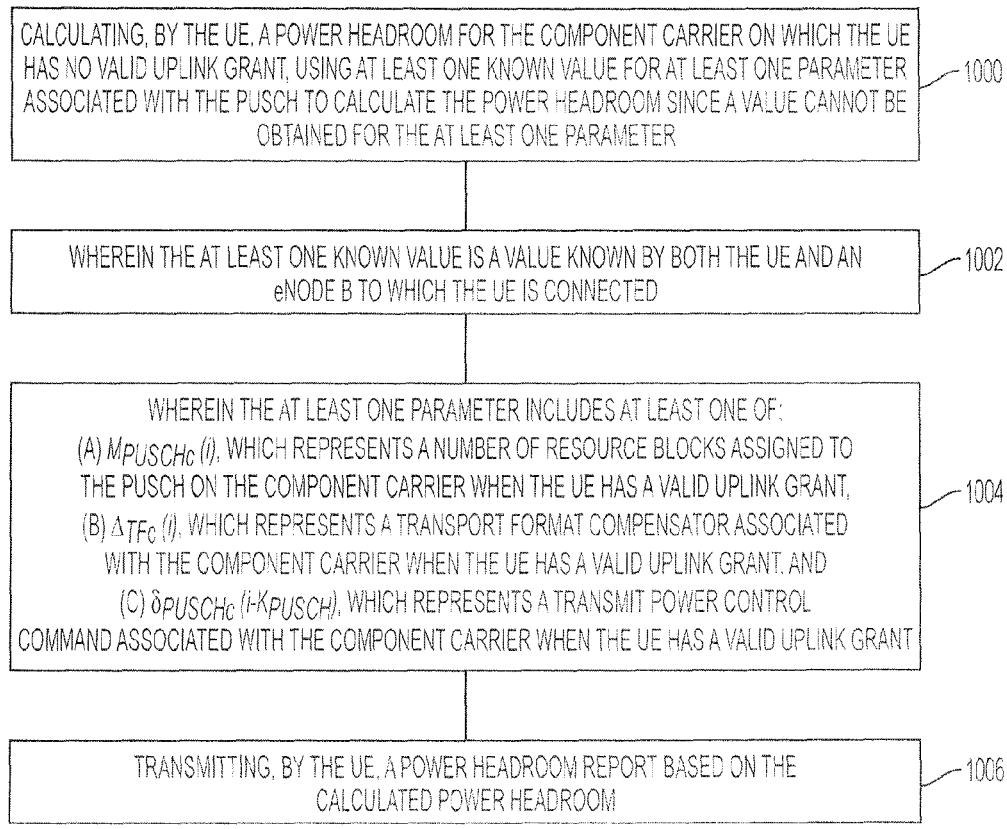
FIGS. 10-13 are flowcharts illustrating methods according to exemplary embodiments.

Thus, a method for power headroom reporting in a radiocommunication system for a component carrier of a Physical Uplink Shared Channel (PUSCH) on which a user equipment (UE) has no valid uplink grant according to an exemplary embodiment can includes the steps illustrated in the flowchart of FIG. 10. Therein, at step 1000, a power headroom is calculated, by the UE, for the component carrier on which the UE has no valid uplink grant, using at least one known value for at least one parameter associated with the PUSCH to calculate the power headroom since a value cannot be obtained for the at least one parameter. The at least one known value is a value known by both the UE and an eNodeB to which the UE is connected (step 1002), and the at least one parameter includes (step 1004) at least one of:

(a) $M_{PUSCHc}$(i) which represents a number of resource blocks assigned to the PUSCH on the component carrier when the UE has a valid uplink grant, (b) $\Delta_{TFc}$(i), which represents a transport format compensator associated with the component carrier when the UE has a valid uplink grant, and (c) $\delta_{PUSCHc}$(i-$K_{PUSCH}$), which represents a transmit power control command associated with the component carrier when the UE has a valid uplink grant. With this information, the UE can then transmit a power headroom report based on the calculated power headroom at step 1006.

Figure 11:
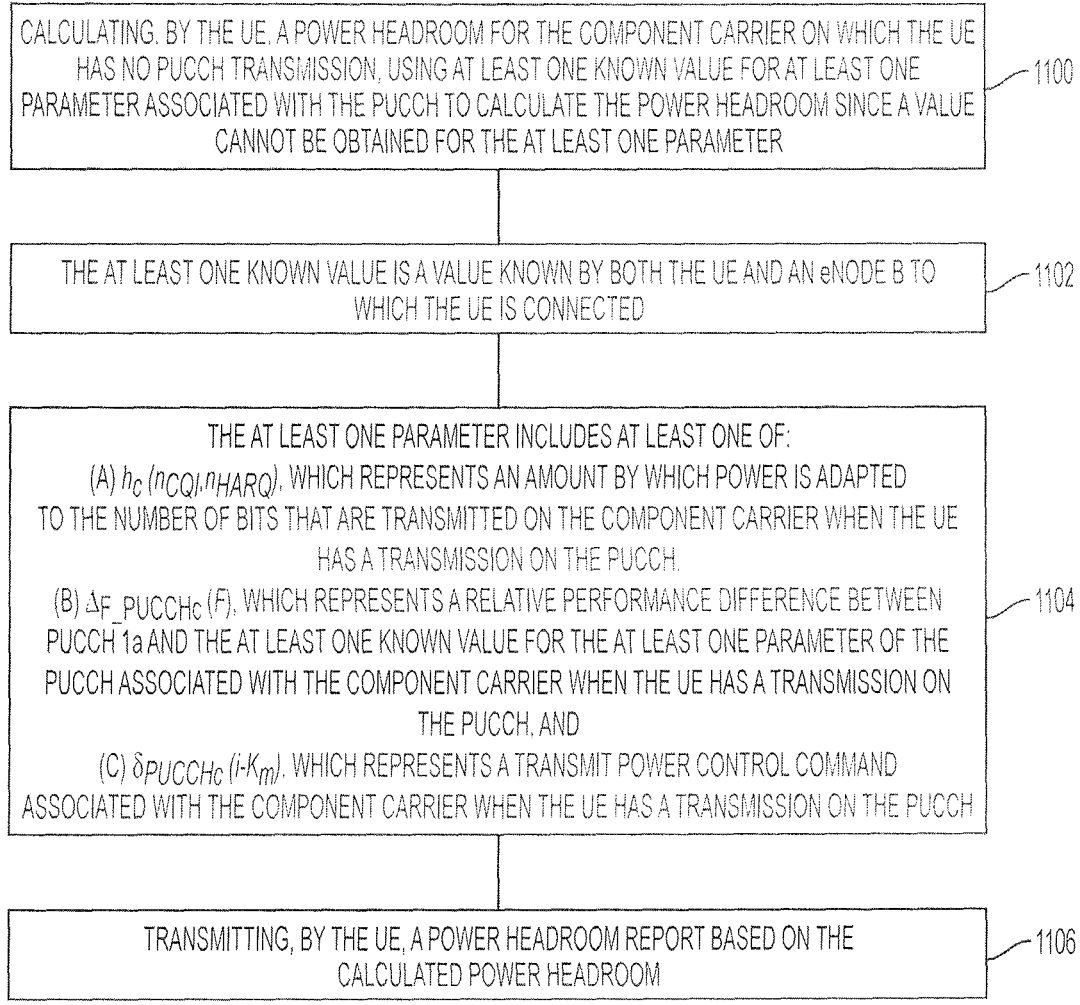

According to another exemplary embodiment, a method for power headroom reporting in a radiocommunication system for a component carrier on which a user equipment (UE) has no current Physical Uplink Control Channel (PUCCH) transmission includes the steps shown in the flowchart of FIG. 11. Therein, at step 1100, a power headroom is calculated, by the UE, for the component carrier on which the UE has no PUCCH transmission, using at least one known value for at least one parameter associated with the PUCCH to calculate the power headroom since a value cannot be obtained for the at least one parameter. The at least one known value is a value known by both the UE and an eNodeB to which the UE is connected (step 1102) and the at least one parameter includes at least one of:

(a) $h_c(n_{CQI}, n_{HARQ})$, which represents an amount by which power is adapted to the number of bits that are transmitted on the component carrier when the UE has a transmission on the PUCCH, (b) $\Delta_{F\_PUCCHc}$(F), which represents a relative performance difference between PUCCH 1a and the at least one known value for the at least one parameter of the PUCCH associated with the component carrier when the UE has a transmission on the PUCCH, and (c) $\delta_{PUCCHc}$(i-$k_m$), which represents a transmit power control command associated with the component carrier when the UE has a transmission on the PUCCH (step 1104). With this information, the UE can then transmit a power headroom report based on the calculated power headroom at step 1106.

Figure 12:
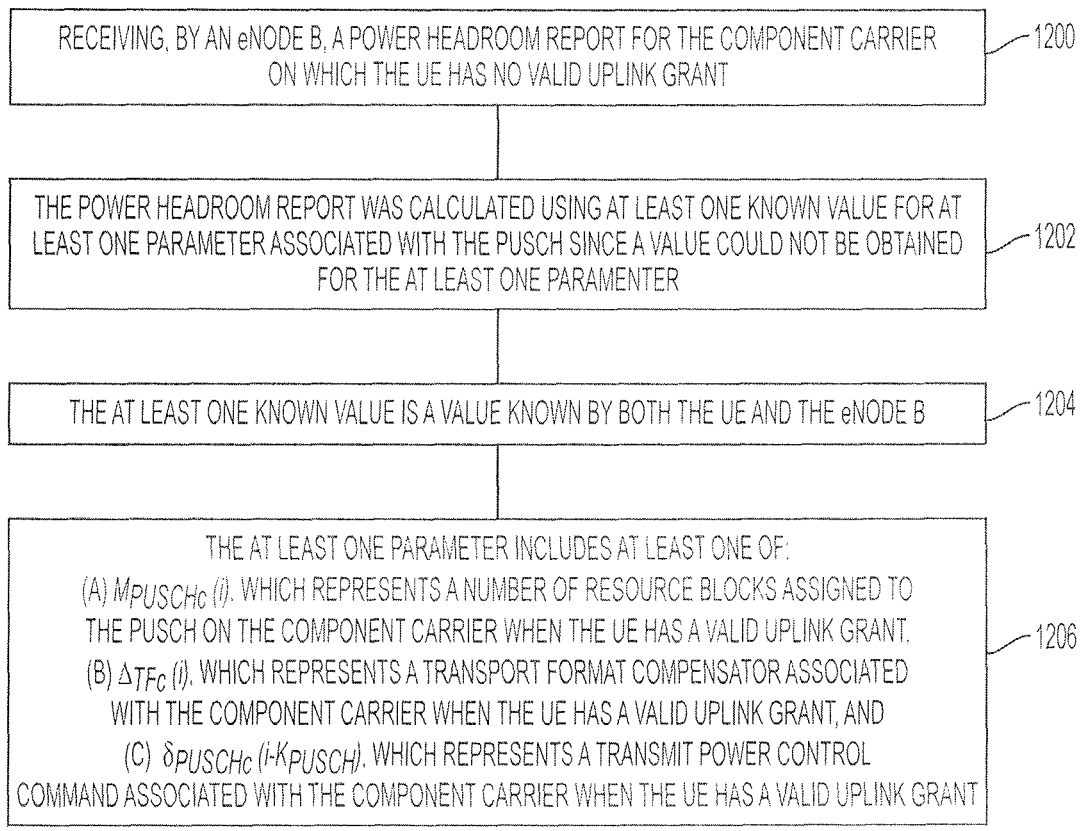

While FIGS. 10 and 11 depict methods from the point of view of the UE, methods in accordance with exemplary embodiments can also be considered from the point of view of the base station or eNode B, i.e., which processes or handles incoming power headroom reports to generate power control commands. Thus a method for power headroom report handling in a radiocommunication system for a component carrier of a Physical Uplink Shared Channel (PUSCH) on which a user equipment (UE) has no valid uplink grant is illustrated in the exemplary embodiment of FIG. 12. Therein, at step 1200, a power headroom report is received, by an eNodeB, for the component carrier on which the UE has no valid uplink grant. The power headroom report was calculated using at least one known value for at least one parameter associated with the PUSCH since a value could not be obtained for the at least one parameter (step 1202) and the at least one known value is a value known by both the UE and the eNodeB (step 1204). The at least one parameter includes at least one of: (a) $M_{PUSCHc}$ (i) which represents a number of resource blocks assigned to the PUSCH on the component carrier when the UE has a valid uplink grant, (b) $\Delta_{TFc}$(i), which represents a transport format compensator associated with the component carrier when the UE has a valid uplink grant, and (c) $\delta_{PUSCHc}$(i-$K_{PUSCH}$), which represents a transmit power control command associated with the component carrier when the UE has a valid uplink grant (step 1206). With this information, the eNodeB can determine, and then transmit, an uplink power control command based on the power headroom report toward the UE.

Figure 13:
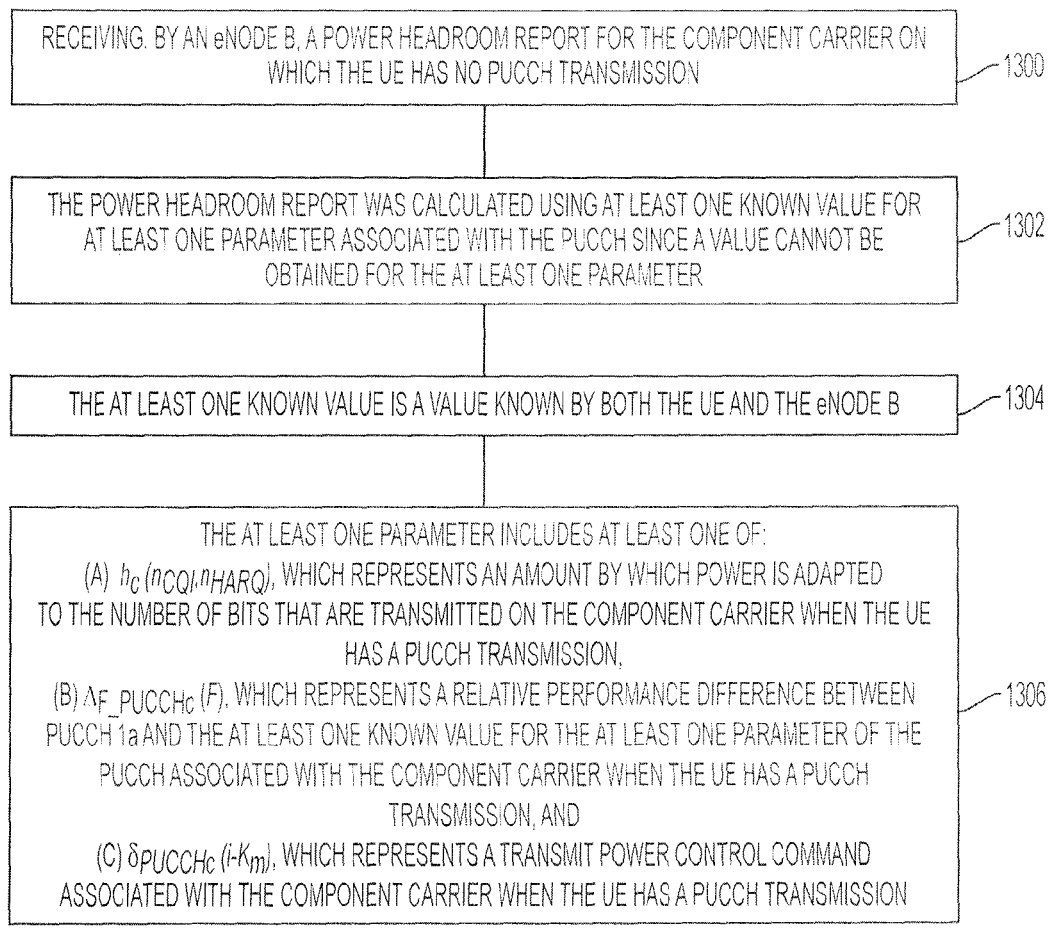

Similarly, for PUCCH handling, a method for power headroom report handling in a radiocommunication system for a component carrier on which a user equipment (UE) has no current Physical Uplink Control Channel (PUCCH) transmission according to an exemplary embodiment is illustrated in the flowchart of FIG. 13. Therein, at step 1300, a power headroom report is received, by an eNodeB, for the component carrier on which the UE has no PUCCH transmission. The power headroom report was calculated using at least one known value for at least one parameter associated with the PUCCH since a value cannot be obtained for the at least one parameter (step 1302) and the at least one known value is a value known by both the UE and the eNodeB (step 1304). Additionally, the at least one parameter includes at least one of:

(a) $h_c(n_{CQI}, n_{HARQ})$, which represents an amount by which power is adapted to the number of bits that are transmitted on the component carrier when the UE has a PUCCH transmission, (b) $\Delta_{F\_PUCCHc}(F)$, which represents a relative performance difference between PUCCH 1a and the at least one known value for the at least one parameter of the PUCCH associated with the component carrier when the UE has a PUCCH transmission, and (c) $\delta_{PUCCHc}(i-k_m)$, which represents a transmit power control command associated with the component carrier when the UE has a PUCCH transmission (step 1306). With this information, the eNode B can determine and then transmit an uplink power control command based on the power headroom report.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method for power headroom reporting in a radio communication system for a component carrier on which a user equipment (UE) has no valid uplink grant for the Physical Uplink Shared Channel (PUSCH), the method comprising:
calculating, by said UE, a power headroom for said component carrier on which said UE has no valid uplink grant, using at least one of:
(a) $M_{PUSCHc}(i)$, which represents a number of resource blocks assigned to said PUSCH on said component carrier when the UE has a valid uplink grant,
(b) $\Delta_{TFc}(i)$, which represents a transport format compensator associated with said PUSCH on said component carrier when the UE has a valid uplink grant, and
(c) $\delta_{PUSCHc}(i-K_{PUSCH})$, which represents a transmit power control command associated with said PUSCH on said component carrier when the UE has a valid uplink grant,
a value known to the UE and an eNodeB to which the UE is connected,
wherein the UE is unable to determine an actual value of the at least one of $M_{PUSCHc}(i)$, $\Delta_{TFc}(i)$ and $\delta_{PUSCHc}(i-K_{PUSCH})$ while having no valid uplink grant; and
transmitting, by said UE, a power headroom report based on said calculated power headroom.

2. The method of claim 1, wherein said value known to both said UE and said eNodeB includes a first predetermined value for $M_{PUSCHc}(i)$, a second predetermined value for $\Delta_{TFc}(i)$ and a third predetermined value for $\delta_{PUSCHc}(i-K_{PUSCH})$.

3. The method of claim 2, wherein said first predetermined value is one.

4. The method of claim 2, wherein said second predetermined value is zero dB.

5. The method of claim 2, wherein said third predetermined value is zero dB.

6. The method of claim 1, further comprising:
receiving, by said UE, a reference format associated with said at least one of $M_{PUSCHc}(i)$, $\Delta_{TFc}(i)$ and $\delta_{PUSCHc}(i-K_{PUSCH})$, in a signal from said eNodeB.

7. The method of claim 1, wherein said power headroom report includes information indicating how much transmission power said UE has left for a subframe.

8. The method of claim 1, wherein said value associated with at least one of $M_{PUSCHc}(i)$, $\Delta_{TFc}(i)$ and $\delta_{PUSCHc}(i-K_{PUSCH})$ is $M_{PUSCHc}(i)$'s, $\Delta_{TFc}(i)$'s and/or $\delta_{PUSCHc}(i-K_{PUSCH})$'s value.

9. The method of claim 1, wherein said value associated with at least one of $M_{PUSCHc}(i)$, $\Delta_{TFc}(i)$ and $\delta_{PUSCHc}(i-K_{PUSCH})$ is a value from which $M_{PUSCHc}(i)$'s, $\Delta_{TFc}(i)$'s and/or $\delta_{PUSCHc}(i-K_{PUSCH})$'s value can be calculated.

10. A user equipment (UE) comprising:
a processor configured to report power headroom for a component carrier in a mode during which said UE has no valid uplink grant for a Physical Uplink Shared Channel (PUSCH) by calculating a power headroom for said component carrier on which said UE has no valid uplink grant, using at least one of:
(a) $M_{PUSCHc}(i)$, which represents a number of resource blocks assigned to said PUSCH on said component carrier when the UE has a valid uplink grant,
(b) $\Delta_{TFc}(i)$, which represents a transport format compensator associated with said component carrier when the UE has a valid uplink grant, and
(c) $\delta_{PUSCHc}(i-K_{PUSCH})$, which represents a transmit power control command associated with said component carrier when the UE has a valid uplink grant, a value known to the UE and an eNodeB to which the UE is connected, wherein the UE is unable to determine an actual value of the at least one of $M_{PUSCHc}(i)$, $\Delta_{TFc}(i)$ and $\delta_{PUSCHc}(i-K_{PUSCH})$ while having no valid uplink grant; and
a transceiver configured to transmit a power headroom report based on said calculated power headroom.

11. The UE of claim 10, wherein said value includes a first predetermined value for $M_{PUSCHc}(i)$, a second predetermined value for $\Delta_{TFc}(i)$ and a third predetermined value for $\delta_{PUSCHc}(i-K_{PUSCH})$.

12. The UE of claim 11, wherein said first predetermined value is one.

13. The UE of claim 11, wherein said second predetermined value is zero dB.

14. The UE of claim 11, wherein said third predetermined value is zero dB.

15. The UE of claim 10, wherein said transceiver is further configured to receive a reference format associated with said at least one of $M_{PUSCHc}(i)$, $\Delta_{TFc}(i)$ and $\delta_{PUSCHc}(i-K_{PUSCH})$, in a signal from said eNodeB.

16. The UE of claim 10, wherein said power headroom report includes information indicating how much transmission power said UE has left for a subframe.

17. The UE of claim 10, wherein said value associated with $M_{PUSCHc}(i)$, $\Delta_{TFc}(i)$ and $\delta_{PUSCHc}(i-K_{PUSCH})$ is $M_{PUSCHc}(i)$'s, $\Delta_{TFc}(i)$'s and/or $\delta_{PUSCHc}(i-K_{PUSCH})$'s value.

18. The UE of claim 10, wherein said value associated with at least one of $M_{PUSCHc}(i)$, $\Delta_{TFc}(i)$ and $\delta_{PUSCHc}(i-K_{PUSCH})$ is a value from which $M_{PUSCHc}(i)$'s, $\Delta_{TFc}(i)$'s and/or $\delta_{PUSCHc}(i-K_{PUSCH})$'s value can be calculated.

19. A method for power headroom report handling in a radio communication system for a component carrier on which a user equipment (UE) has no valid uplink grant for the Physical Uplink Shared Channel (PUSCH), the method comprising:

receiving, by an eNodeB, a power headroom report for said component carrier on which said UE has no valid uplink grant, wherein said power headroom report was calculated using at least one known value for at least one of:
(a) $M_{PUSCHc}(i)$, which represents a number of resource blocks assigned to said PUSCH on said component carrier when the UE has a valid uplink grant,
(b) $\Delta_{TFc}(i)$, which represents a transport format compensator associated with said PUSCH on said component carrier when the UE has a valid uplink grant, and
(c) $\delta_{PUSCHc}(i-K_{PUSCH})$, which represents a transmit power control command associated with said PUSCH on said component carrier when the UE has a valid uplink grant, a value known to the UE and an eNodeB to which the UE is connected, wherein the UE is unable to determine an actual value of the at least one of $M_{PUSCHc}(i)$, $\Delta_{TFc}(i)$ and $\delta_{PUSCHc}(i-K_{PUSCH})$ while having no valid uplink grant.

20. The method of claim 19, wherein said value includes a first predetermined value for $M_{PUSCHc}(i)$, a second predetermined value for $\Delta_{TFc}(i)$ and a third predetermined value for $\delta_{PUSCHc}(i-K_{PUSCH})$.

21. The method of claim 20, wherein said first predetermined value is one.

22. The method of claim 20, wherein said second predetermined value is zero dB.

23. The method of claim 20, wherein said third predetermined value is zero dB.

24. The method of claim 19, further comprising:
transmitting, by said eNodeB, a reference format associated with said at least one of $M_{PUSCHc}(i)$, $\Delta_{TFc}(i)$ and $\delta_{PUSCHc}(i-K_{PUSCH})$.

25. The method of claim 19, wherein said power headroom report includes information indicating how much transmission power said UE has left for a subframe.

26. The method of claim 19, wherein said at least one known value associated with at least one of $M_{PUSCHc}(i)$, $\Delta_{TFc}(i)$ and $\delta_{PUSCHc}(i-K_{PUSCH})$ is $M_{PUSCHc}(i)$'s, $\Delta_{TFc}(i)$'s and/or $\delta_{PUSCHc}(i-K_{PUSCH})$'s value.

27. The method of claim 19, wherein said at least one known value associated with at least one of $M_{PUSCHc}(i)$, $\Delta_{TFc}(i)$ and $\delta_{PUSCHc}(i-K_{PUSCH})$ is a value from which $M_{PUSCHc}(i)$'s, $\Delta_{TFc}(i)$'s and/or $\delta_{PUSCHc}(i-K_{PUSCH})$'s value can be calculated.

28. An eNodeB comprising:
a processor configured to receive a power headroom report for a component carrier of a Physical Uplink Shared Channel (PUSCH) in a mode during which a UE has no valid uplink grant, and interpret said power headroom report based on knowledge that the power headroom report was calculated using for at least one of:
(a) $M_{PUSCHc}(i)$, which represents a number of resource blocks assigned to said PUSCH on said component carrier when the UE has a valid uplink grant,
(b) $\Delta_{TFc}(i)$, which represents a transport format compensator associated with said component carrier when the UE has a valid uplink grant, and
(c) $\delta_{PUSCHc}(i-K_{PUSCH})$, which represents a transmit power control command associated with said component carrier when the UE has a valid uplink grant, a value known to the UE and the eNodeB to which the UE is connected, the UE being unable to determine an actual value of the at least one of $M_{PUSCHc}(i)$, $\Delta_{TFc}(i)$ and $\delta_{PUSCHc}(i-K_{PUSCH})$ while having no valid uplink grant; and
a transceiver configured to transmit an uplink power control power headroom command based on said power headroom report.

29. The eNodeB of claim 28, wherein said value includes a first predetermined value for $M_{PUSCHc}(i)$, a second predetermined value for $\Delta_{TFc}(i)$ and a third predetermined value for $\delta_{PUSCHc}(i-K_{PUSCH})$.

30. The eNodeB of claim 29, wherein said first predetermined value is one.

31. The eNodeB of claim 29, wherein said second predetermined value is zero dB.

32. The eNodeB of claim 29, wherein said third predetermined value is zero dB.

33. The eNodeB of claim 28, wherein said transceiver is further configured to transmit a reference format associated with said at least one of $M_{PUSCHc}(i)$, $\Delta_{TFc}(i)$ and $\delta_{PUSCHc}(i-K_{PUSCH})$, in a signal toward said UE.

34. The eNodeB of claim 28, wherein said power headroom report includes information indicating how much transmission power said UE has left for a subframe.

35. The eNodeB of claim 28, wherein said value associated with at least one of $M_{PUSCHc}(i)$, $\Delta_{TFc}(i)$ and $\delta_{PUSCHc}(i-K_{PUSCH})$ is $M_{PUSCHc}(i)$'s, $\Delta_{TFc}(i)$'s and/or $\delta_{PUSCHc}(i-K_{PUSCH})$'s value.

36. The eNodeB of claim 28, wherein said value associated with at least one of $M_{PUSCHc}(i)$, $\Delta_{TFc}(i)$ and $\delta_{PUSCHc}(i-K_{PUSCH})$ is a value from which that $M_{PUSCHc}(i)$'s, $\Delta_{TFc}(i)$'s and/or $\delta_{PUSCHc}(i-K_{PUSCH})$'s value can be calculated.

* * * * *